United States Patent

Searle

[11] 3,725,998
[45] Apr. 10, 1973

[54] FRICTION WELDING

[75] Inventor: John Gilbert Searle, Hednesford, England

[73] Assignee: Allwood, Searle & Timney Limited, Digbeth, Walsall, Stafordshire, Great Britain

[22] Filed: Mar. 17, 1970

[21] Appl. No.: 20,376

[30] Foreign Application Priority Data

Mar. 18, 1969 Great Britain...................14,134/69

[52] U.S. Cl. ........................29/470.3, 156/73, 228/2
[51] Int. Cl. ............................................B23k 27/00
[58] Field of Search ........................228/2; 156/73; 29/470.3; 192/67, 70.14

[56] References Cited

UNITED STATES PATENTS

| 3,417,457 | 12/1968 | Burke et al. | 29/470.3 |
| 3,609,854 | 10/1971 | Hasui | 228/2 X |
| 3,330,391 | 7/1967 | Mamo | 192/70.14 X |

*Primary Examiner*—J. Spencer Overholser
*Assistant Examiner*—R. J. Craig
*Attorney*—Scrivener, Parker, Scrivener and Clarke

[57] ABSTRACT

In friction welding the two components to be welded are rotated about spaced parallel axes at the same angular velocity and in the same rotational sense. Adjacent end faces of the components rub against each other so that heat is generated. When welding temperature is reached the rotational axes of the components are aligned and the components are pressed together, normally while still rotating, to effect welding.

6 Claims, 11 Drawing Figures

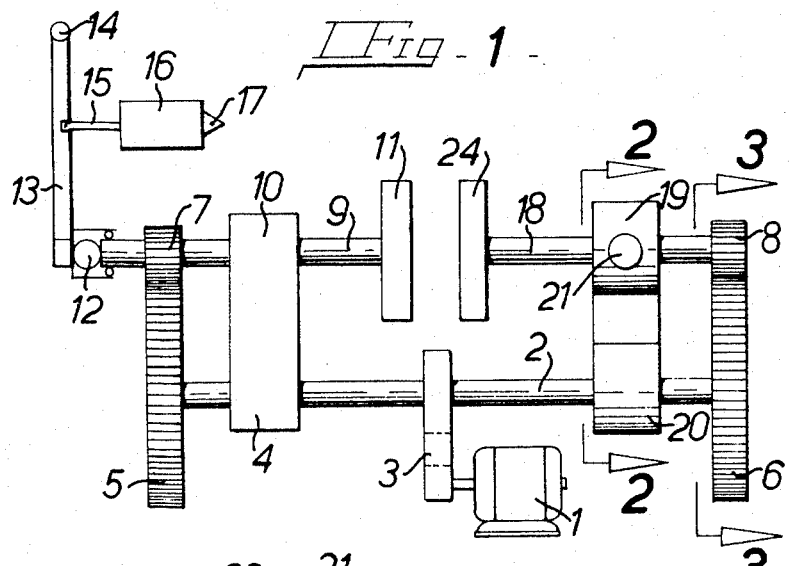
Fig. 1
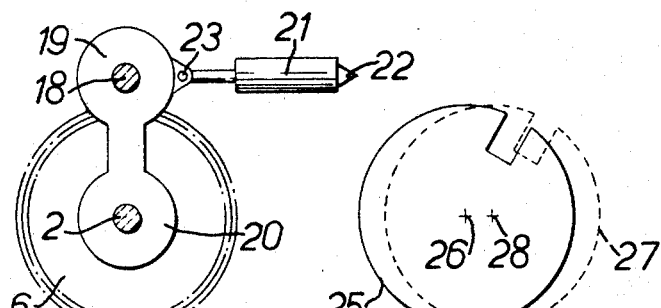
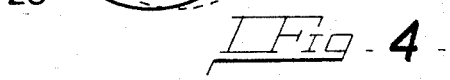
Fig. 2
Fig. 4
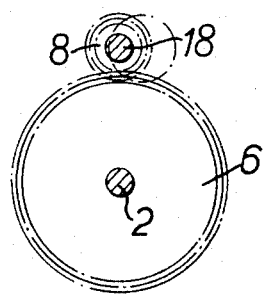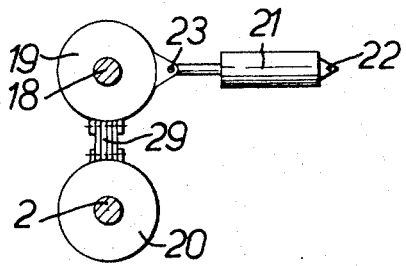
Fig. 3
Fig. 5

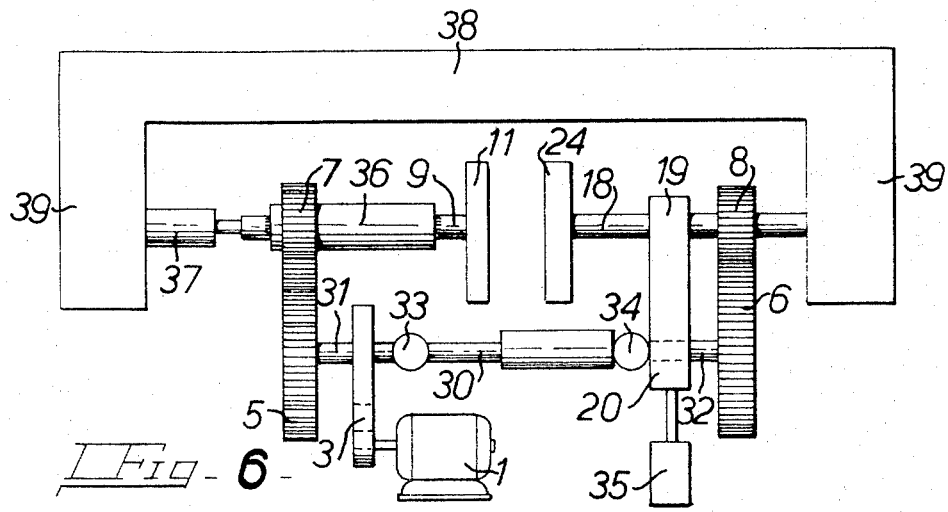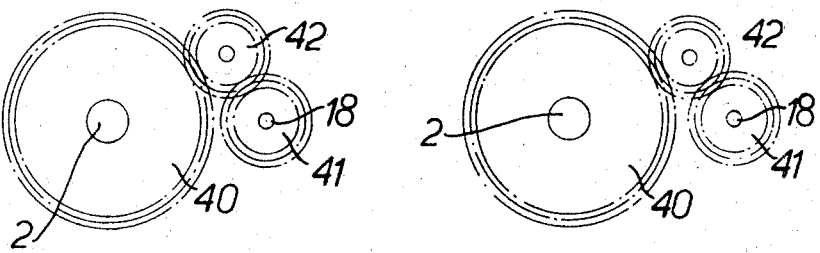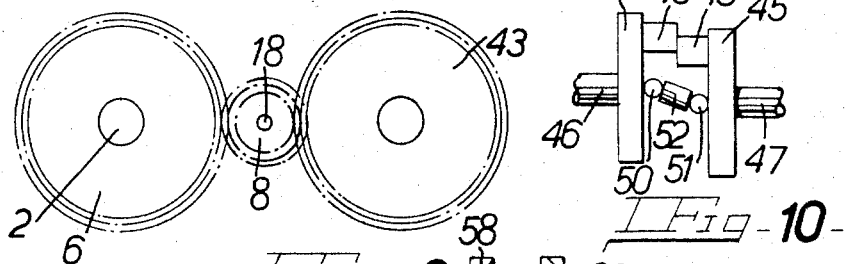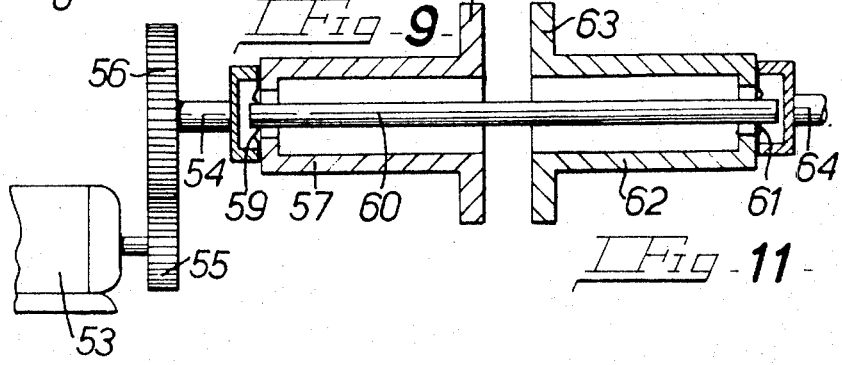

FRICTION WELDING

This invention relates to friction welding.

In conventional friction welding it is the practice to cause rapid relative movement between two components to be welded together, the components being urged into contact with each other so that heat is generated by friction at the abutting faces of the components. When sufficient heat has been generated the relative movement is stopped and the components are pressed together, usually with considerably greater force than before, so that they become welded together.

The relative movement may be reciprocatory, but this often involves the rapid reciprocation of heavy parts and thus requires the expenditure of much power and necessitates the provision of strong and rigid frames and supports. Alternatively the relative movement may be rotational, but this is restricted to the welding of components which are symmetrical about the axis of rotation; further, where circular faces are to be welded together there is much greater relative movement by the periphery of the faces than at the center so that much more heat is generated near the periphery than near the center.

The present invention overcomes or at least reduces all of these difficulties.

From its broadest aspect the present invention consists in a method of friction welding two components together characterized in that heat for welding is generated by rotating the components about spaced parallel axes at the same angular velocity and in the same rotational sense while end faces of the components normal to the axes are urged together.

From another aspect the present invention consists in a method of friction welding two components together which comprises rotating the two components about spaced parallel axes at the same angular velocity and in the same rotational sense while adjacent end faces of the components normal to the axes are urged together, so that heat for welding is generated by friction between the end faces, aligning the axes of rotation and pressing the components together, while the components are still rotating, so that they become welded together.

From yet another aspect the present invention consists in apparatus for friction welding components together, comprising a pair of rotatably component-supports, means enabling said component-supports to be rotated at the same angular velocity and in the same sense, means for causing relative movement between the component-supports while they are rotating such that they can move between a position in which their axes of rotation are mutually parallel and a position in which their axes are mutually aligned, and means operative to urge the component-supports towards each other, while they are still rotating, to enable welding to be effected when the axes are mutually aligned.

The invention is applicable to the welding of metals, of plastics materials, and of any other appropriate materials.

In friction welding in accordance with the invention the two components to be welded together are disposed end to end with their end faces abutting each other. The components are mounted on appropriate supports which can be rotated about parallel or aligned axes which are normal to the mutually abutting end faces of the components. The components are so arranged that when the axes of rotation of the supports are aligned the components are in the relative positions in which they are to be welded together. Initially, however, the rotational axes of the supports are not aligned but are spaced apart somewhat and parallel with each other. The spacing is such that the end faces of the components remain overlapping. The component supports with the components mounted on them are rotated at the same angular velocity and in the same sense, while the components are urged into contact with each other. The velocity of rotation is such that sufficient heat is generated by friction to cause the end faces to reach welding temperature. When this occurs the supports are rapidly brought into axial alignment, normally while they are still rotating, with the result that the components are brought into the relative positions in which they are to be welded together. As the rotational axes are aligned and the components are constrained to rotate with the same angular velocity and in the same sense there can no longer be any relative movement between the end faces. Before the components have had time to cool they are urged together very much more strongly so that they become welded together.

One particular advantage of the invention is that it enables components to be welded together in a predetermined angular relationship; for example two round bars each formed with a keyway can be welded together with the keyways mutually aligned. Similarly any components of non-circular cross-section, such as bars of square or triangular cross-section, can be welded together with the aid of the present invention. This is impossible when using the traditional friction welding technique in which heat is generated by rotating one component relatively to the other.

Another advantage of the invention is that a plurality of components can simultaneously be welded together in pairs. Each component-support may be adapted to support a plurality of components as the relative movement between any one pair of components is independent of the distance between a component and the axis of rotation of its support. The relative movement between any one pair of components, in fact, depends solely on the velocity of rotation and the distance between the axes of rotation of the supports. In consequence each component-support may be adapted to support a circular array or several concentric circular arrays of components centered on the axis of rotation but spaced from it.

The invention will now be more particularly described with reference to the accompanying drawings which are largely diagrammatic and in which:

FIG. 1 is a side view of apparatus embodying the invention;

FIG. 2 is a section on the line 2—2 of FIG. 1;

FIG. 3 is a section on the line 3—3 of FIG. 1;

FIG. 4 is a view to a larger scale of one end face of a component, the end face of another component to which it is to be welded being shown in broken lines;

FIG. 5 is similar to FIG. 2 but illustrates an alternative construction;

FIG. 6 is a diagrammatic view of another apparatus embodying the invention;

FIG. 7 is similar to FIG. 3 but illustrates an alternative construction;

FIG. 8 is similar to FIG. 7 but shows the parts in different relative positions;

FIG. 9 is a view similar to FIG. 7 but illustrates a further alternative construction;

FIG. 10 is a cross-section through a pair of component-supports and means for driving them; and FIG. 11 is a side view of another pair of component-supports and means for driving them.

The apparatus shown in FIGS. 1 to 3 comprises an electric motor 1 which causes a drive shaft 2 to rotate through the intermediary of a pulley and belt assembly 3. The drive shaft 2 runs in fixed bearings, one of which is indicated at 4. At the ends of the drive shaft 2 are toothed wheels 5 and 6 which engage and drive complementary toothed wheels 7 and 8 respectively.

Wheel 7 is fixed on a shaft 9 which runs in a fixed hydrostatic bearing 10 but is axially movable in the bearing 10. At one end the shaft 9 carries a component-support 11, while at the other end the shaft enters a bearing 12 slidable axially in the frame of the apparatus (not shown). The bearing 12 can be forced in an axial direction by a lever 13 pivoted to the frame at 14 and coupled to the piston rod 15 of a hydraulic piston-and-cylinder unit 16 which is pivoted to the frame at 17.

Wheel 8 is fixed on a shaft 18 which runs in a hydrostatic bearing 19 connected to a bearing 20 through which the drive shaft 2 extends. The shaft 18 is restrained against axial movement in the bearing 19, but can be moved at right angles to the plane containing the axes of the drive shaft 2 and shaft 18. This movement can be effected by means of a double-acting hydraulic piston-and-cylinder unit 21 pivoted to the frame at 22 and with its piston rod coupled to the bearing 19 at 23. When the unit 21 is actuated the shaft 18 moves in an arcuate path about the axis of the shaft 2. That end of the shaft 18 further from the toothed wheel 8 carries a component-support 24 similar to the component support 11. These supports may take any convenient form and may for example comprise chucks similar to those on lathes.

In use the components to be welded together are mounted on the component-supports 11 and 24 with their end faces abutting each other, and the unit 21 is so operated that the axes of the shaft 9 and 18 are spaced by a small distance, for example one thirty second of an inch (0.8 mm), apart. The wheel 8 then takes up the position indicated in chain-dotted lines in FIG. 3, though the displacement has here been exaggerated for clarity. A relatively small axial force is applied to the shaft 9, and the motor 1 operates to rotate the components about spaced parallel axes at the same angular velocity and in the same sense. When welding temperature is reached the unit 21 is operated to bring the shafts 9 and 18 into alignment, the wheel 8 taking up the position shown in full lines in FIG. 3. The axial force applied to the shaft 9 is considerably increased and the components thus become welded together.

The arrangement may be such that the unit 21 can be disconnected and the component-supports 11 and 24 swung apart to assist the attachment of the components to be welded.

FIG. 4 shows the end faces of two typical components which can be welded together, the components comprising cylindrical rods with keyways in them. During the frictional generation of heat the face 25 shown in full lines rotates about the axis 26 while the face 27 shown in broken lines rotates about the axis 28 at the same angular velocity and in the same sense. Thus the two keyways remain closely adjacent at all times and are automatically brought into true alignment when the axes are made co-axial.

Numerous modifications of this apparatus are of course possible. Thus the movement of the bearing 19 and the application of the forces to the shaft 9 can be effected, for example, by means of leadscrews, or linkages, or cams, or by pneumatic means. Further the connection between the drive shaft 2 and each of the shafts 9 and 18 may be, for example, by chains and chain-wheels, or by toothed belts and toothed wheels, or by eccentric connecting rods or links.

FIG. 5 shows a modification in which the bearing 20 is fixed relatively to the frame and the bearing 19 is connected to it by means of a leaf spring assembly 29 which yields when the unit 21 is operated.

Reference has been made to a frame to which the components are secured. This may take any appropriate form. Tie rods may also extend between those parts of the frame which are urged apart when the welding forces are applied.

The apparatus shown in FIG. 6 largely resembles that shown in FIG. 1, and similar parts have been given the same reference numerals. The principal differences are that the drive shaft 2 has been replaced by a three-part drive shaft, the central part 30 of which is longitudinally extensible, comprising a splined shaft in a sleeve. The central part 30 is connected to the end parts 31 and 32 by universal joints 33 and 34 respectively. The bearings 19 and 20 are mounted on a slide so that they are constrained to move in a direction parallel to the plane containing the axes of the part-shaft 32 and the shaft 18. This movement is effected by a unit 35 similar to the unit 21, and is made possible by virtue of the universal joints 33 and 34 and extensible part 30. The toothed wheel 7 is fixed to an internally splined sleeve 36 through which the shaft 9, provided with complementary splines, extends. This permits axial movement of the shaft 9 in the sleeve. The welding force is applied to the shaft 9 by an hydraulic piston-and-cylinder unit 37 co-axial with the shaft 9. Finally there is shown a frame 38 which includes arms 39 which take the reaction of the welding forces. That end of the shaft 18 further from the component-support 24 is carried in a bearing slidable in the adjacent arm 39 to permit movement of the shaft 18. Here again the arrangement is preferably such that the movement of the bearings 19 and 20 can be relatively extensive so as to enable the component-supports to be separated for loading of the components.

In a modified form of the apparatus shown in FIG. 1, not illustrated, the shaft 18 is movable towards and away from the shaft 2 rather than around it. The bearing 20 is fixed while the bearing 19 is moved by a unit similar to the unit 35. Various methods may be used to enable the relative movement between the shafts 2 and 18 to occur while the drive continues. For example in the arrangement shown in FIGS. 7 and 8 shafts 2 and 18 carry gear wheels 40 and 41 respectively which mesh with a gear 42 so mounted as to move around the axes of the shafts 2 and 18 when these shafts are moved towards and away from each other. In another method a gear 43, similar to the gear 6 is driven in unison with gear 6 about an axis at a fixed distance from the axis of the shaft 2 on the opposite side of the gear 8. The teeth of the gears 6, 8 and 43 are such that the gear 8, while remaining in engagement with the gears 6 and 43 can be moved between the position illustrated, in which it is in full engagement with gear 43 but only partial engagement with gear 6 to a position in which it is in full engagement with gear 6 and only partial engagement with gear 43.

Rather than driving the component-supports from a drive-shaft spaced to one side of them it is possible to drive one support from the other through a suitable flexible and extensible connection. FIG. 10 illustrates this diagrammatically. Supports 44 and 45 are fixed to shafts 46 and 47 respectively, and carry components 48 and 49 to be welded together. The supports carry universal joints 50 and 51 respectively which are linked to the ends of an extensible coupling rod 52. A practical embodiment is shown in FIG. 11, where a motor 53 drives a shaft 54 through gears 55 and 56. The shaft 54 is connected to a tubular housing 57 having a component-support 58 at that end further from the shaft 54. A flexible diaphragm 59 couples the housing to a coupling rod 60 which has a similar diaphragm 61 at the other end which is in turn coupled to a housing 62 like the housing 57. The housing 62 carries a component-support 63 and is also connected to a shaft 64 which is mounted in a bearing movable transversely by any appropriate means.

It will be appreciated that the welding forces, velocities and times involved in the welding processes are the same as those used in conventional friction welding, and it is for this reason that such details are not included herein.

Numerous modifications are possible within the scope of the present invention. For example in the embodiments described above the welding force is applied through one component-support while the other component-support is movable in a transverse direction. It is possible, however, for the welding force to be applied through the same component-support that is movable laterally, the other component-support having its axis fixed and being arranged to transmit the force to a part of the apparatus affording a reaction to the welding force.

I claim:

1. A method of friction welding two components together which comprises rotating the two components about spaced but adjacent parallel axes at the same angular velocity and in the same rotational direction while adjacent end faces of the components normal to said axes are urged together, continuing said rotation until welding heat is generated by friction caused by relative movement between said end faces, causing relative movement between the components to cease and pressing the components together so that they become welded together.

2. A method of friction welding two components together which comprises rotating the two components about spaced but adjacent parallel axes at the same angular velocity and in the same rotational direction while adjacent end faces of the components normal to said axes are urged together, continuing said rotation until welding is generated by friction caused by relative movement between said end faces, aligning the axes of rotation and pressing the components together so that they become welded together.

3. A method according to claim 2 in which the axes of rotation are aligned and the components are pressed together so that they become welded together, while the components are still rotating.

4. Apparatus for friction welding components together, comprising a pair of rotatable component-holders each operative to hold at least one component tightly in position, driving means operative to cause said component-holders to be rotated at the same angular velocity and in the same direction, shifting means for causing relative movement between the component-holders while they are rotating such that they can move from a first position in which their axes of rotation are in spaced adjacency with each other and mutually parallel and a second position in which their axes are mutually aligned, and means operative to urge the component-holders towards each other, while they are in their first position so as to cause frictional engagement between abutting end faces of components held by the component-holders, and means operative to urge the component-holders towards each other while they are in their second position and are still rotating, to enable welding to be effected when the axes are mutually aligned.

5. Apparatus according to claim 4 in which the driving means comprises a drive member rotatable about an axis parallel with the axes of the component-holders and means drivingly interconnecting the drive member and each of the component-holders whereby rotation of the drive member causes rotation of the component-holders.

6. Apparatus according to claim 4 in which the driving means comprises a rotatable drive member operative to rotate one of the component-holders, and coupling means interconnecting the component-holders and operative to transmit the drive from said one component-holder to the other component-holder.

* * * * *